US012776528B2

(12) United States Patent
Dunn

(10) Patent No.: US 12,776,528 B2
(45) Date of Patent: Oct. 27, 2026

(54) THERMAL MANAGEMENT OF ELECTROCHEMICAL STORAGE DEVICES

(71) Applicant: Electric Power Systems, Inc., North Logan, UT (US)

(72) Inventor: Randy Dunn, Orange, CA (US)

(73) Assignee: Electric Power System, Inc., North Logan, UT (US)

( * ) Notice: Subject to any disclaimer, the term of this patent is extended or adjusted under 35 U.S.C. 154(b) by 1296 days.

(21) Appl. No.: 17/285,878

(22) PCT Filed: Oct. 10, 2019

(86) PCT No.: PCT/US2019/055715
§ 371 (c)(1),
(2) Date: Apr. 15, 2021

(87) PCT Pub. No.: WO2020/081372
PCT Pub. Date: Apr. 23, 2020

(65) Prior Publication Data

US 2021/0359353 A1 Nov. 18, 2021

Related U.S. Application Data

(60) Provisional application No. 62/745,747, filed on Oct. 15, 2018.

(51) Int. Cl.
*H01M 10/613* (2014.01)
*H01M 10/6568* (2014.01)
*H01M 10/6569* (2014.01)

(52) U.S. Cl.
CPC ..... *H01M 10/613* (2015.04); *H01M 10/6568* (2015.04); *H01M 10/6569* (2015.04)

(58) Field of Classification Search
None
See application file for complete search history.

(56) References Cited

U.S. PATENT DOCUMENTS 2,855,453 A * 10/1958 Eidensohn .......... H01M 10/615 429/120
4,292,381 A 9/1981 Klein
(Continued)

FOREIGN PATENT DOCUMENTS

CN 102576851 7/2012
CN 103125046 5/2013
(Continued)

OTHER PUBLICATIONS

Japan Patent Office, Notice of Allowance dated Nov. 10, 2023 in JP Serial No. 2021-546191.
(Continued)

*Primary Examiner* — Haroon S. Sheikh
*Assistant Examiner* — Claire A Rutiser
(74) *Attorney, Agent, or Firm* — SNELL & WILMER L.L.P.

(57) ABSTRACT

Electrochemical cell battery systems and associated methods of operation are provided based on the incorporation of a thermal suppression construct including a supply of an electrically non-conductive, non-flammable, coolant. The coolant provides a first cooling method that benefits the cells by cooling them during normal operating modes and provides a second cooling method in the case of high temperature abnormal situations wherein the coolant is dispensed internal to the cell to cool the electrode directly and render the cell inert.

12 Claims, 4 Drawing Sheets

(56) References Cited

U.S. PATENT DOCUMENTS

| | | | | |
|---|---|---|---|---|
| 8,187,739 B2 | 5/2012 | Takagi | | |
| 9,093,726 B2 | 7/2015 | Prilutsky et al. | | |
| 9,379,419 B2 | 6/2016 | Krolak | | |
| 2010/0062328 A1* | 3/2010 | Takagi | H01M 10/6567 | 429/120 |
| 2012/0177973 A1* | 7/2012 | Schaefer | H01M 10/615 | 165/104.11 |
| 2013/0065094 A1* | 3/2013 | Kim | H01M 50/516 | 429/50 |
| 2014/0342201 A1* | 11/2014 | Andres | H01M 50/682 | 165/80.4 |
| 2016/0233564 A1 | 8/2016 | Rinker et al. | | |
| 2017/0207433 A1* | 7/2017 | Hong | H01M 10/0431 | |
| 2018/0191038 A1 | 7/2018 | Li et al. | | |
| 2018/0241092 A1 | 8/2018 | Goitsuka et al. | | |

FOREIGN PATENT DOCUMENTS

| | | |
|---|---|---|
| CN | 106816668 | 6/2017 |
| CN | 207038662 U | 2/2018 |
| CN | 207800738 | 8/2018 |
| EP | 2804188 A1 | 11/2014 |
| EP | 3867962 A1 | 11/2014 |
| JP | 2012-252909 | 12/2012 |
| JP | 2015220177 | 12/2015 |
| KR | 10-1340365 | 12/2013 |
| KR | 20160025714 | 3/2016 |
| WO | 2020081266 A1 | 4/2020 |

OTHER PUBLICATIONS

Brazil Patent Office, Preliminary Office Action dated Jun. 13, 2023 in BR App No. 112021007085-0.

International Search Report and Written Opinion dated Dec. 19, 2019 in PCT International Patent Application No. PCT/US2019/055715.

International Preliminary Report on Patentability dated Apr. 14, 2021 in PCT International Patent Application PCT/US2019/055715.

Balakrishnan et al., "Safety mechanisms in lithium-ion batteries," Journal of Power Sources, 155, pp. 401-414 (2006).

EPO, European Search Report dated May 27, 2022 in EP Application No. 19873098.8.

China National Intellectual Property Administration, First Office Action dated Feb. 27, 2023 in CN App No. 201980082037.4.

CNIPA, Second Office Action dated Oct. 14, 2023 with CN Serial No. 2023101400151160.

Korean Intellectual Property Office; Notification of Provisional Rejection dated Jan. 21, 2025 in Korean Application 10-2021-7014278.

Canadian Intellectual Property Office, Canadian Office Action dated Nov. 20, 2023 in Application No. 3,116,551.

* cited by examiner

THERMAL MANAGEMENT OF ELECTROCHEMICAL STORAGE DEVICES

CROSS REFERENCE TO RELATED APPLICATIONS

This application is a U.S. national stage entry under 35 U.S.C. § 371 of International Application No. PCT/US2019/055715 filed Oct. 10, 2019 entitled "THERMAL MANAGEMENT OF ELECTROCHEMICAL STORAGE DEVICES", which claims priority to, and the benefit of, U.S. Provisional Patent Application Ser. No. 62/745,747, filed on Oct. 15, 2018 and entitled "THERMAL MANAGEMENT OF ELECTROCHEMICAL STORAGE DEVICES," the disclosure of which, is incorporated herein by reference to the extent such disclosure does not conflict with the present disclosure.

TECHNICAL FIELD

The present disclosure relates generally to a battery, and, more particularly to a secondary battery comprised of a plurality of electrochemical or electrostatic cells.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may be inventions.

A secondary battery is a device consisting of one or more electrochemical or electrostatic cells, hereafter referred to collectively as "cells", that can be charged electrically to provide a static potential for power or released electrical charge when needed. The cell is basically comprised of at least one positive electrode and at least one negative electrode. One common form of such a cell is the well-known secondary cells packaged in a cylindrical metal can or in a prismatic case. Examples of chemistry used in such secondary cells are lithium cobalt oxide, lithium manganese, lithium iron phosphate, nickel cadmium, nickel zinc, and nickel metal hydride. Other types of cells include capacitors, which can come in the form of electrolytic, tantalum, ceramic, magnetic, and include the family of super and ultra-capacitors. Such cells are mass produced, driven by an ever-increasing consumer market that demands low cost rechargeable energy for portable electronics. Energy density is a measure of a cell's total available energy with respect to the cell's mass, usually measured in Watt-hours per kilogram, or Wh/kg. Power density is a measure of the cell's power delivery with respect to the cell's mass, usually measured in Watts per kilogram, or W/kg. Both energy density and cost are critical metrics of the value of traction batteries as documented in "Lithium-ion Batteries for Hybrid and All-Electric Vehicles: the U.S. Value Chain", edited by Marcy Lowe, Saori Tokuoka, Tali Trigg and Gary Gereffi, said teaching incorporated here by reference.

In order to attain the desired operating voltage level, cells are electrically connected in series to form a battery of cells, which is typically referred to as a battery. In order to attain the desired current level, cells are electrically connected in parallel. When cells are assembled into a battery, the cells are often electrically linked together through metal strips, straps, wires, bus bars, etc., that are welded, soldered, or otherwise fastened to each cell to link them together in the desired configuration.

Secondary batteries are often used to drive traction motors in order to propel electric vehicles. Such vehicles include electric bikes, motorcycles, cars, busses, trucks, trains, and so forth. Such traction batteries are usually large with hundreds or thousands or more individual cells linked together internally and installed into a case to form the assembled battery.

Failure modes of such cells include an exothermic event, also known as thermal runaway. This feature makes the use of such cells highly dangerous in certain applications, such as onboard aircraft, vehicles, or in medical applications. Common causes of thermal runaway include over charge, external short circuit, or internal short circuits. Over charge and external short circuits can be prevented by use of fuses and over voltage disconnect devices. However, such devices are ineffective at preventing internal short circuits since there is no practical way to stop shorts across the substantially large anode to cathode interface internal to the cell. Positive thermal coefficient devices are sometimes installed inside cells for convenience and improved security, but the positive thermal coefficient devices are still unable to stop anode to cathode internal shorts since they reside outside of that circuit. Circuit interruption devices, whether mechanical or electronic can protect against over charge, but since they are also outside the anode to cathode circuit, they are unable to do anything to protect against internal shorts.

Thermal events pose a substantial threat to the aforementioned traction batteries given the large number of cells each contains. The probability of a thermal event increases with the number of cells, as does the potential for thermal event cascade to other cells within the battery, resulting in an increase in the overall impact potential of the event. Accordingly, some form of thermal runaway mitigation is beneficial to the overall safety of the battery.

A novel solution of having the cells immersed in an electrically non-conductive hydrofluoroether fluid has been shown to mitigate thermal runaway, without the need for pumps or other complex apparatus requiring maintenance or prone to failure, is taught in publication number US 2009/0176148 A1. This patent application discloses the immersion of batteries into a container filled with a heat transfer fluid, and containing a heat exchanger at least partially filled with the heat transfer fluid. The fluid is a liquid or gas, and preferably a heat transfer fluid such as a hydrofluoroether (HFE) that has a low boiling temperature, e.g. less than 80° C. or even less than 50° C. The vaporization of this fluid contributes to the heat removal from the immersed batteries.

HFEs are available, for example, under the trade designation NOVEC Engineered Fluids (available from 3M Company, St. Paul, Minn.) or VERTREL Specialty Fluids (available from DuPont, Wilmington, Del.). Particularly useful HFEs for embodiments within the aforementioned patent include NOVEC 7100, NOVEC 7200, NOVEC 71 IPA, NOVEC 71DE, NOVEC 71DA, NOVEC 72DE, and NOVEC 72DA, all available from 3M. As described in the above mentioned patent application, cells immersed within said fluid do not go into thermal runaway due to the vaporization of the fluid. Immersing a cell in a fluid is effective at heat removal at temperatures well below cell ignition point. This has been demonstrated to be true, despite repeated short circuit attempts using standard practices known to normally induce such events.

A disadvantage of this approach to improving the safety of batteries is the reliance on gas and/or liquid as the transfer fluid. HFEs in particular are very slippery materials, and gas or liquids within the battery pack case are prone to escape upon any opening being formed in the case, such as by impact or through direct permeation. In some instances, a reservoir may be added to mitigate losses of material through the case over time. The reservoir provides a backup to the coolant that escapes over time. This also has the added benefit of providing additional coolant into the battery when needed.

One disadvantage to both of these approaches is in the mass of the material required to implement such solutions in large scale traction batteries. The amount of fluid required to fulfill these designs is substantial since the entire battery is full of the coolant, and there is even more coolant mass carried in the described coolant pool. HFEs are very heavy, typically twice the mass density of water. This is very disadvantageous for traction batteries since the batteries typically already comprise a large portion of the vehicle overall mass. As stated above, the gravimetric energy density is a critical metric to the value of traction batteries. Although there is the capability to stop the thermal event, the cell or cells affected still retain the capability to cause a thermal event. Although the heat has been removed, the cell is unaffected internally. Should the coolant be exhausted, as in the case of a sustained over-charge condition where the external energy source exceeds the cooling capacity of the available coolant, including any reserves stored in additional reservoirs, the cell could then enter into a thermal event situation. Previous techniques have not address how to disable or "safe" the cell.

Another disadvantage to the use of so much material is its cost. Typically, HFEs cost around US $60/kg. Although US 2009/0176148 does not disclose specifically the amount of fluid used in the comparative examples, it does state that the cells are immersed. Immersion of the cells is assumed to be at least 20% of the cell volume. The A123 cell used in the experiment has a density of 1.7 kg/l, and the HFE has a density of 2 kg/l. Based on this assessment, simply flooding a large traction battery of 100 kWh in energy comprising A123 cells has a mass of 951 kg and requires 223 kg of coolant. This is a 23% mass overhead compared to the cells alone. The coolant would further cost US $13,425 at 2018 prices, and compared to the cell cost of US $30,000, that is a 44% cost overhead compared to the cells alone. As cited above, the overall cost is a critical metric to the value of traction batteries.

In addition to the aforementioned disadvantages of the prior art, one major fault is the way they work exclusively external to the cells. The case examples for publication number US 2009/0176148 A1 are cylindrical rigid hard cases that do not expand during heating. No mention is made of the widely used soft pouch cells nor prismatic cells that often employ plastic or thin wall flexible metals. These cases do not respond favorably to any of the prior art teachings. Key reasons are the inherent flexibility of the cases themselves. During an induced thermal event, internally generated gases force the cases to swell. The electrodes in the cells are separated from the cell case by gaps filled in by these gases. This prevents the coolant from thermally reacting with the electrodes, which are the source of the internal heat generation. The ability for the coolant to affect the thermal event is substantially hindered, the cases may still go into in thermal runaway.

A method and structure for mitigating the effects of overheating batteries, with minimal impact to mass and cost would be desirable.

SUMMARY

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

In an embodiment of the present teachings, a battery system can include one or more cells comprising a sealed case, disposed within the case an electrochemical cell comprising a set of electrodes and an electrolyte. The sealed case includes at least one pressure relief valve. The electrodes comprise at least one anode and at least one cathode, typically isolated by a thin separator. The at least one anode is connected to an electrically and thermally conductive, negative terminal having a presence internal to and external to the sealed case of the cell. The at least one cathode is connected to an electrically and thermally conductive positive terminal having a presence internal to and external to the sealed case of the cell. One or both of the electrically and thermally conductive terminals may include an electrical attachment mechanism to permit the electrical connection of the cell in a system in conventional fashion. One or both of the electrically and thermally conductive terminals may include at least one coolant inlet and at least one coolant outlet for the passage of coolant into and out of the terminal. The one or both of the electrically and thermally conductive terminals, hereafter referred to as the "cooling terminal", comprises passageways internally to allow the passage of the coolant through the cooling terminal. The cooling terminal includes at least one thermal sensitive actuator that is within thermal proximity to the electrodes.

A specific non-electrically conductive hydrofluoroether or similar thermal fluid with a low boiling point, that is not electrically conductive and does not have a natural flash-point, hereafter referred to a "thermal fluid", is applied within the cooling terminal. This fluid may be static or optionally circulated through the cooling terminal. Circulation may be managed in a conventional method using some type of pump apparatus, heat exchanger with some method to remove heat from or add heat to the thermal fluid. In normal operation the passage of coolant through the terminal provides a mechanism to control the temperature of the cooling terminal. Since the cooling terminal is thermally connected to the electrode within the cell case, it provides a direct method to cool or heat the electrode as desired. By controlling cell temperature directly in this manner, the system does not need to cool or heat the cell through the case wall. This allows the case to be made from thermally non-conductive materials such as plastic. The benefits of plastic are cost and thermal isolation. Thermal isolation helps mitigate cell to cell thermal runaway propagation for tightly packed cells in a battery system.

Another benefit of the present disclosure is how it manages a thermal runaway event. If a cell heats sufficiently it enables the at least one thermally sensitive actuator in the cooling terminal to open and thereby release the thermal fluid that floods directly onto the electrodes and electrolyte. The thermal fluid cools the electrodes by phase change, vaporization, causing the pressure to increase, thereby forcing ventilation through the at least one exhaust vent, releasing and suppressing the thermal event. Through experimentation of a polymer pouch type lithium cell through overcharge, where the electrode is overcharged at 1.5 times the nominal voltage and 8 times the current rating, there have been notable observations. It has been observed that during the electrolyte vaporization process, e.g., when to the thermal fluid and the electrolyte are both vaporizing simultaneously due to heat, the resulting steam from the two fluids mixes intimately as the thermal fluid floods deep in the porous cavities of the electrode. It has been observed that the resulting steam mixture stays cool and non-flammable, inheriting this feature from the thermal fluid which is present in substantially larger quantity than the electrolyte. The thermal fluid, in this case the commercial available NOVEC 7100 which has a boiling point of 61 deg C., maintains a very low electrode temperature under 70 deg C., and boils off with the electrolyte in approximately 150 seconds. After this time, the electrolyte has safely been exhausted outside of the cell case and the electrodes are thereafter rendered inert, unable to either accept any charge, discharge and current, or generate any heat. This is exceptionally beneficial since it is not always certain that the cause of overcharge or short circuit or other outside stimuli will cease at any specific time. This is beneficial over the prior art which relies on continuously available coolant or removal of the external source and does not render the cell inherently inert.

BRIEF DESCRIPTION OF THE DRAWINGS

The accompanying drawings, which are hereby incorporated into and constitute a part of this specification, illustrate embodiments of the present disclosure and, together with the description, serve to explain the principles of the invention. In the drawings, wherein like reference numerals represent like parts.

DETAILED DESCRIPTION

The following description is of various example embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments, without departing from the scope of the appended claims. For example, the steps recited in any of the method or process descriptions may be executed in any order and are not necessarily limited to the order presented. Moreover, many of the manufacturing functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. As used herein, the terms “coupled,” “coupling,” or any other variation thereof, are intended to cover a physical connection, an electrical connection, a magnetic connection, an optical connection, a communicative connection, a functional connection, and/or any other connection.

For the sake of brevity, conventional techniques for mechanical system construction, management, operation, measurement, optimization, and/or control, as well as conventional techniques for mechanical power transfer, modulation, control, and/or use, may not be described in detail herein. Furthermore, the connecting lines shown in various figures contained herein are intended to represent example functional relationships and/or physical couplings between various elements. It should be noted that many alternative or additional functional relationships or physical connections may be present in a modular structure.

From the forgoing, it will be apparent to the reader that one important and primary object of the present disclosure resides in the provision of a novel method to prevent thermal runaway of an electrochemical cell or group of cells. The disclosure has the advantage of having an automatic response mechanism based on cell temperature and has reduced mass and financial impact as compared to the prior art.

Figure 1:
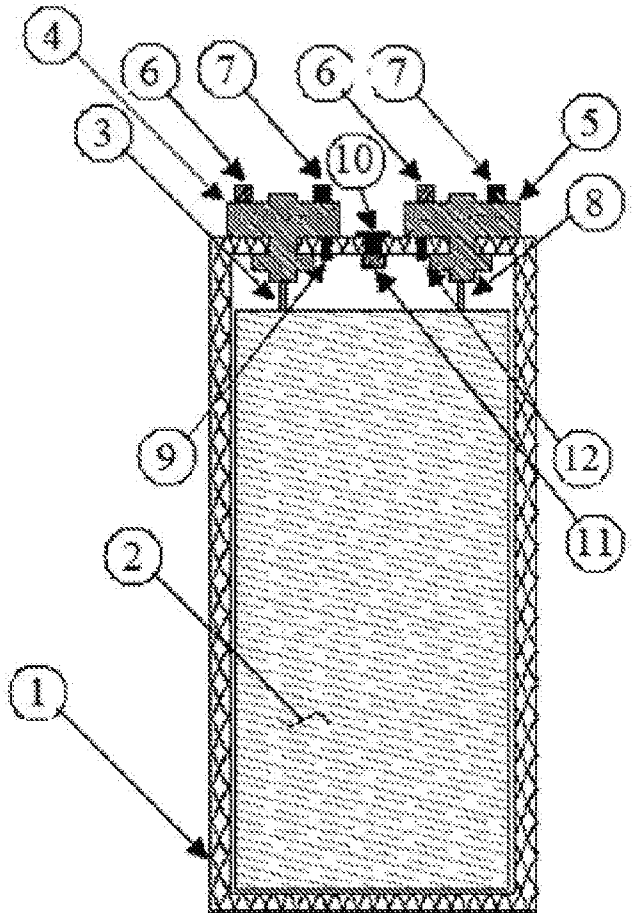
FIG. 1 illustrates a top view of an assembled battery, in accordance with an example embodiment.

Referring now to FIG. 1, a proposed battery solution comprises a sealed case 1 capable of housing one or more internal electrode stacks 2 that are saturated with an organic electrolyte (not depicted) in a conventional manner known in the field of construction of lithium ion cells. The sealed case 1 may be made from a wide variety of materials capable of be providing the mechanical support for the cells and having the ability to be completely sealed. Various structural plastics, including acrylonitrile butadiene styrene (ABS), polypropylene (PP), and polyethylene (PE) are preferred for their thermally insulative properties, but metallized mylar and metals, including aluminum and steel that are commonly used in the construction of lithium ion batteries are also suitable materials.

The sealed case 1 also features at least one vent port 10 with a pressure release valve 11, at least one positive terminal 4 and at least one negative terminal 5. The at least one positive terminal 4 is electrically connected to the electrode stack cathode 3. The at least one negative terminal 5 is electrically connect to the electrode stack anode 8. Such cells may be connected in series or parallel or a combination of series and parallel. At least one of either the at least one positive terminal 4 or the at least one negative terminal 5, comprises at least one coolant inlet 6, at least one coolant outlet 7, and at least one dispensing port 9. For purposes of simplification, from this point forward the description will use only the at least one positive terminal 4 as the exemplary embodiment of the present disclosure. It important to clarify, however, that one terminal may comprise a coolant inlet 6, a coolant outlet 7 and a dispensing port 9, and the other terminal may include these features or be a conventional terminal lacking these features without taking away from the functionality of the present disclosure.

The dispensing port 9 and the coolant outlet 7 may be utilized without the other and still be within the scope of this disclosure. For example, a battery terminal may comprise a coolant inlet 6 and a dispensing port 9. Thus, the heat transfer fluid may be static within the battery terminal and released through the dispensing port 9 to prevent a thermal runaway event. In another example embodiment, a battery terminal may comprise a coolant inlet 6 and a coolant outlet 7. Thus, a coolant may constantly flow through the coolant inlet 6 through a cooling circuit and out the coolant outlet 7 to regulate the internal temperature of the cells within the battery system.

The pressure release valve 11 is sealed under normal operating conditions. It does not let gases or liquids in or out of the sealed case 1 under normal operating conditions. This may prevent dry out of the electrolyte or ingress of external contaminants. The pressure release valve 11 releases the gases out of the sealed case 1 if the pressure inside the sealed case 1 exceeds the designated pressure level. The pressure level of activation of the pressure release valve 11 varies according to the size of the battery, but in general is relatively low, greater than 1 PSIG but less than about 200 PSIG in most applications.

The at least one positive terminal 4, connected to the one or more internal electrode stacks 2 by methods well known to those skilled in the art, provides not only an electrical connection between the them but also a thermal connection. In an example embodiment, internal to the at least one positive terminal 4 are passageways to allow a heat transfer fluid to flow in from the at least one coolant inlet 6 and out through the at least one coolant outlet 7. The at least one coolant inlet 6 and the at least one coolant outlet 7 are sized to allow sufficient fluid to pass through to provide the desired cooling or heating effect on the at least one positive terminal 4, the electrode stack cathode 3, and one or more internal electrode stacks 2.

In an example embodiment, the at least one coolant inlet 6 and the at least one coolant outlet 7 are connected to a cooling circuit. For example, the cooling circuit may comprise non-electrically conductive tubing, pump, radiation, reservoir, filter, and so on. Moreover, any suitable system for circulating the heat transfer fluid may be used. The heat transfer fluid dispensed in the system is electrically non-conductive so as to not cause shorts between and across cells. The cooling circuit is employed in a conventional manner to heat and cool the heat transfer fluid in order to warm or cool the cells by forcing the fluid through the at least one positive terminal 4 of every cell. An electrically non-conductive heat transfer fluid such as a hydrofluoroether (HFE) that has a low boiling temperature, e.g. less than 80° C. or even less than 70° C. is dispensed within the cooling circuit. This property of the heat transfer fluid is that it begins to boil at a temperature that is towards the high operating temperature range of the cells. Examples of material classes are highly-fluorinated compounds used commercially for cleaning electronic components. Commercial examples of suitable coolants include the 3M™ Novec™ Engineered Fluids family of products, sold under the trade names HFE-7100, HFE-7200, and others. HFE-7100 has a boiling point of 61 deg C., which is highly compatible with many commercial electrochemical cells that have a peak operating temperature range of 65 deg C.

The at least one dispensing port 9 may be connected to the passageways internal to the at least one positive terminal 4 and sized to allow sufficient fluid to pass in respect to the size of the cavity in order to suppress any thermally event that may occur. The at least one dispensing port 9 may comprise a thermally sensitive plug 12 that is sensitive to, and activated by, excessive heat. The thermally sensitive plug 12 may be a made from a metal that melts at a desired temperature. Suitable metals include eutectic or fusible alloys with low melting points, including alloys of lead, bismuth, and tin and commonly known by names like Wood's Metal, Rose Metal, and Lipowitz's Alloy. Such metals are well known and used extensively in fire sprinkler valves, preventing pressurized water from exiting a pipe until triggered by heat, at which time the alloy softens sufficiently to release a sealing plug. The thermally sensitive plug 12 may alternatively comprise a heat-sensitive glass bulb, also well known and used extensively in fire sprinkler valves. As with the alloy, the glass bulb is designed to break as a result of thermal expansion as it heats up, thereby opening the seal that restricts the coolant, releasing the coolant within the sealed case 1 and dispensing the coolant to the electrode stacks 2. The size and location of at least one dispensing port 9 is driven by the specific geometry of the internal cavities, and may be located on the top, bottom, or side of the internal cavity or any combination thereof.

The first cooling method of the present disclosure considers the battery is in normal operating condition. In normal operation, a heat transfer fluid in accordance with the exemplary definition is pumped through the at least one positive terminal 4 of each cell in the system. Through the process of adding or removing heat to or from the heat transfer fluid, the at least one positive terminal 4 cools/heats the electrode stack cathode 3 and the one or more internal electrode stacks 2 are heated or cooled through thermal conduction.

The second cooling method of the present disclosure considers the battery is in a failed condition with at least one cell overheating. The process for this cooling method is triggered by excessive temperature within the one or more internal electrode stacks 2. This excessive heat activates the thermally sensitive plug 12, thereby releasing the heat transfer fluid through the at least one dispensing port 9. The heat transfer fluid is thereby released into the sealed case 1, flooding the respective cavity and coming into direct contact with the one or more internal electrode stacks 2. At this time the thermal transfer fluid will begin to cool the one or more internal electrode stacks 2. A temperature of the one or more internal electrode stacks 2 may stabilize, which may mitigate the thermal event. If a temperature of the one or more internal electrode stacks 2 continues to increase, it will eventually exceed the boiling point of the thermal transfer fluid. The boiling point of the thermal transfer fluid is chosen to be well below the ignition point of the electrolyte chemistry employed in the one or more internal electrode stacks 2. For example, heat transfer fluid HFE-7100 has a boiling point of 61 deg C., which is highly compatible with many commercial electrochemical cells that have a peak operating temperature range of 65 deg C. HFE-7100 flooded in the sealed case 1 will hinder the increase in temperature of the one or more internal electrode stacks 2 from exceeding much above the 61 deg C. boiling point of the fluid. As the one or more internal electrode stacks 2 heat up, the electrolyte boils off as a vapor. This vapor is normally highly flammable and can initiate the well know thermal runaway process known to afflict lithium ion cells. The normally highly flammable electrolyte vapor blends with the vapors of the boiling heat transfer fluid which has no flash point and is completely non-flammable. The thermal transfer fluid, fed by the cooling circuit, is present in larger quantities than the electrolyte, which typically represents only 5-10% of the cell by weight. The blended vapor is non-flammable and remains cool by the low boiling point of the heat transfer fluid. As the pressure quickly builds, the pressure release valve 11 is activated and the at least one vent port 10 vents under the pressure and releases the blended vapor into the atmosphere. The process of low temperature boiling of the heat transfer fluid and release of the resulting vapor cools the at least one or more electrode stacks 2, keeping them from attaining a temperature that would ignite a thermal runaway event, start a fire or source any flames.

Another aspect of the present disclosure is that the boiling off of the electrolyte in this safe manner is a finite event. Very quickly the electrolyte is completely expelled from the one or more internal electrode stacks 2 and the sealed case 1, removing it safely from the one or more internal electrode stacks 2 and thereby making the cell inert. The resulting inert cell is quickly rendered devoid of all electrolyte and incapable of thereafter causing harm as it is no longer capable of absorbing internal energy that might cause heat nor capable of discharging energy that might cause heat. The cell then cools passively and no longer poses any threat to safety.

The disclosure also offers substantial mass reductions since the amount of coolant required is sized to just a portion of the battery system. This is in sharp contrast to the techniques for cooling a group of cells in a battery system that involves flooding the space between the cells with a comparably large quantity of thermal transfer fluid. The novel approach takes advantage of the very low probability that more than one cell would suffer an internal short resulting in a potential thermal event at any one time in a large battery. The failure rate of modern cells is 0.1 ppm, or 10e-7. This is the probability that one cell will experience a thermal event given a long period of time in a battery system with a large number of cells, but the odds drop to 10e-14 for two such cells suffering a thermal event at the same time. Therefore it is virtually impossible that two cells would suffer the same fate simultaneously in such a system. As the present disclosure has the capability to defuse a single cell thermal event with a very small amount of heat transfer fluid specifically targeted at the event location, it provides an optimized solution that is an improvement over the prior art.

Another aspect of the present disclosure is reduced battery volume. Separation of cells is a common practice for mitigating thermal propagation. But such separation is not trivial in order to be reliable and results in a larger heavier battery. The present disclosure also reduces battery volume and mass further in that the separation of cells can be very small. It is also possible, as describe, to place more than one cell into each cavity. Although only one cell is likely to suffer a thermal event, the other cells will be minimally affected due to the heat transfer fluid dispensed throughout the share cavity.

Thus, in an example embodiment, a battery comprises a thermal runaway suppression system safeguarded by a phase change vaporization fluid, wherein the additional volume of the fluid safeguarding the battery is 1-10% of the total cell volume of the battery. More preferably, the additional volume of the fluid safeguarding the cells is 1-5% of the total cell volume of the battery. In another example embodiment, the additional volume of the fluid safeguarding the cells is 3-5% of the total cell volume of the battery.

Thus, in an example embodiment, a battery comprises a thermal runaway suppression system safeguarded by a phase change vaporization fluid, wherein the additional mass of the fluid safeguarding the battery is 1-10% of the mass of the battery if there were no fluid safeguarding the battery. More preferably, the additional mass of the fluid safeguarding the cells is 1-5% of the mass of the battery if there were no fluid safeguarding the battery. In another example embodiment, the additional mass of the fluid safeguarding the cells is 3-5% of the mass of the battery if there were no fluid safeguarding the battery. The greatest mass and volume savings are in large systems comprising hundreds of internal cavities.

Figure 2:
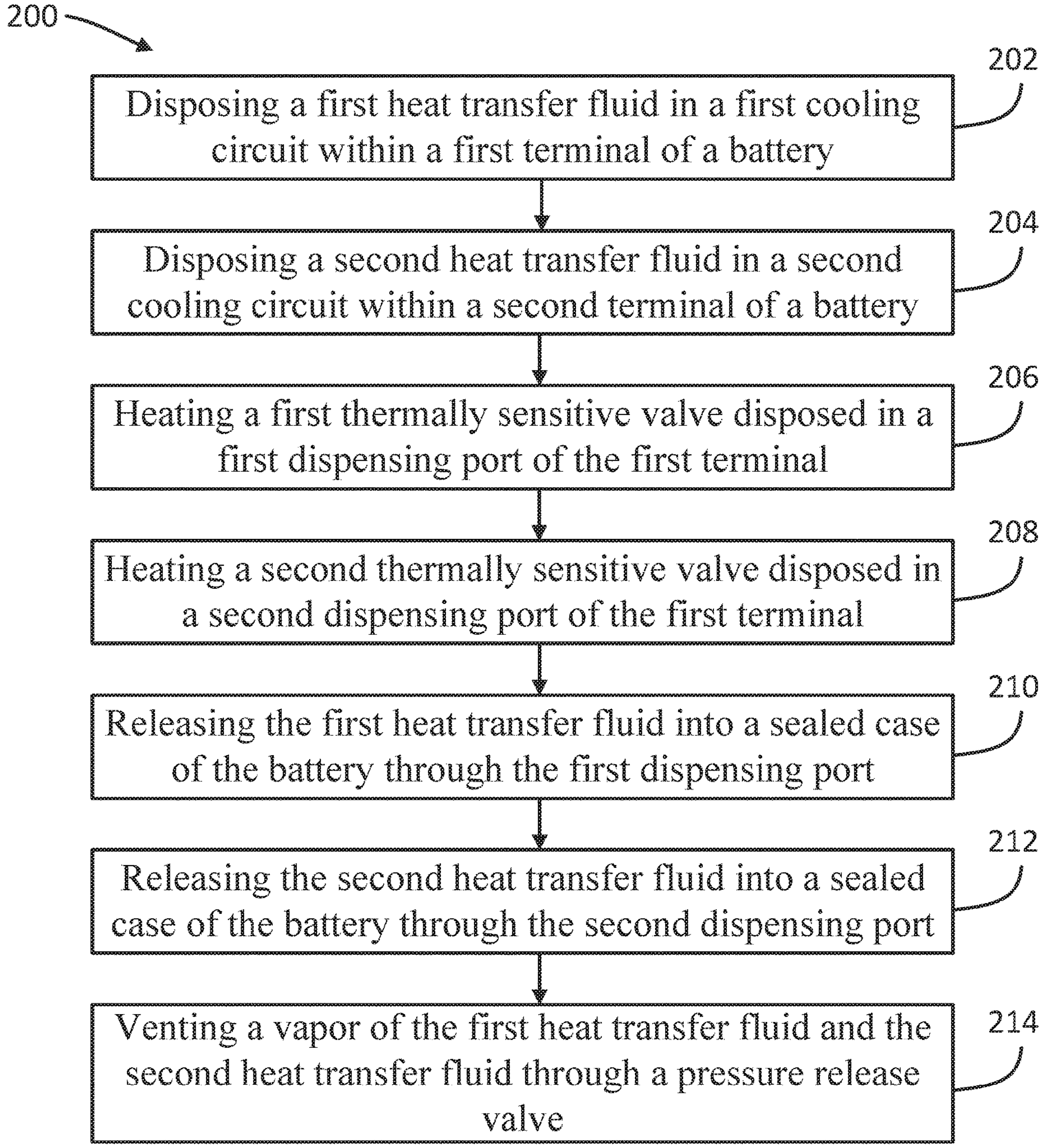
FIG. 2 illustrates a method of controlling a temperature in a battery.

Referring now to FIG. 2, a method 200 of controlling a temperature in a battery and/or a method of preventing thermal runway, in accordance with an example embodiment, is illustrated. The method 200 comprises disposing a first heat transfer fluid in a first cooling circuit within a first terminal of a battery (step 202). The first heat transfer fluid may be static or dynamic (i.e., flowing through the first cooling circuit). The first terminal may be a positive terminal, such as at least one positive terminal 4. The method 200 may further comprise disposing a second heat transfer fluid in a second cooling circuit within a second terminal of the battery (step 204). The second heat transfer fluid may be the first heat transfer fluid. The second heat transfer fluid may be the same as the first heat transfer fluid or different than the first heat transfer fluid. The first cooling circuit and the second cooling circuit may be fluidly coupled. The second heat transfer fluid may be static or dynamic (i.e., flowing through the second cooling circuit). The second terminal may be a negative terminal, such as at least one negative terminal 5.

The method may further comprise heating a first thermally sensitive valve disposed in a first dispensing port of the first terminal (step 206) and/or heating a second thermally sensitive valve disposed in a second dispensing port of the second terminal (step 208). The heat may be generated from a cell in an internal electrode stack within a sealed case of a battery. The cell may be experiencing a thermal runaway event and generating enough heat to melt the first thermally sensitive valve. The method may further comprise releasing the first heat transfer fluid into the sealed case of the battery through the first dispensing port (step 210) and/or releasing the second heat transfer fluid into the sealed case of the battery through the second dispensing port (step 212). The first heat transfer fluid and/or the second heat transfer fluid may immerse the cell experiencing the thermal runaway event and/or prevent cascading to adjacent cells. The method may further comprise venting a vapor of the first heat transfer fluid and/or the second heat transfer fluid through a pressure release valve (step 214). The pressure release valve may be coupled to a venting port of the sealed case. The pressure release valve may release in response to a pressure of the vapor generated from the thermal runaway event and the heating of the first heat transfer fluid and/or the second heat transfer fluid.

Figure 3:
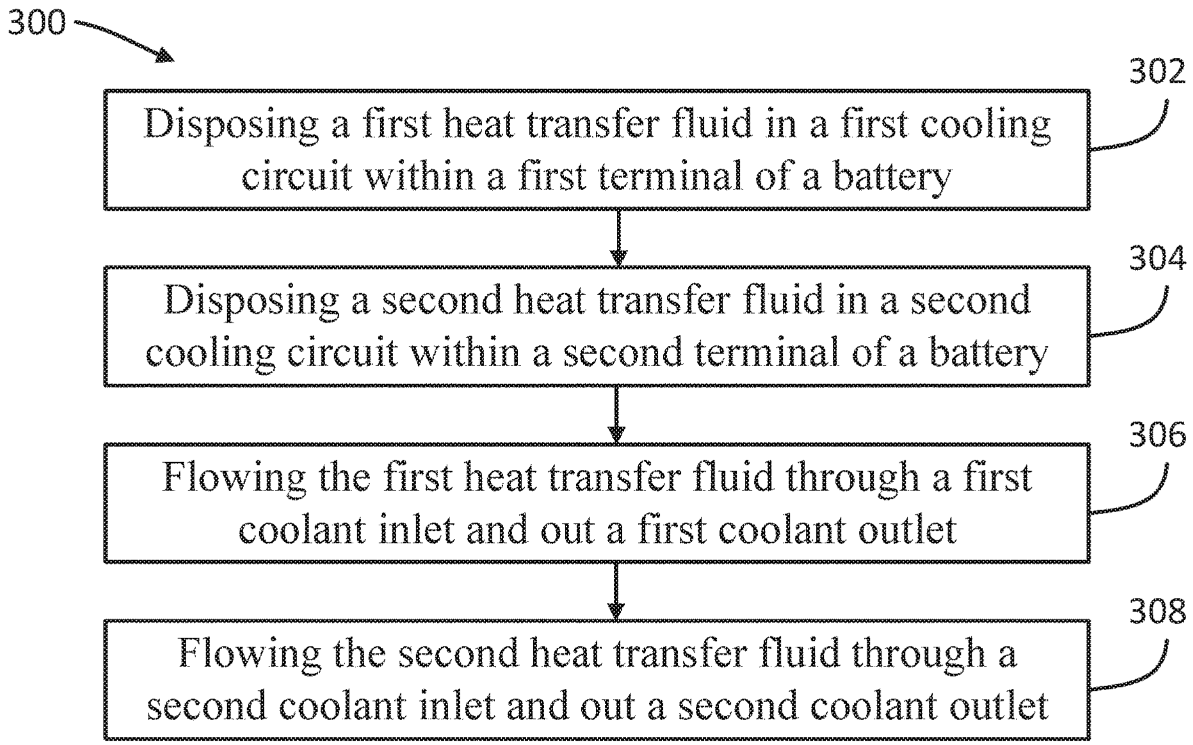
FIG. 3 illustrates a method of preventing a thermal runaway event, in accordance with an example embodiment.

Referring now to FIG. 3, a method 300 of controlling a temperature in a battery, in accordance with an example embodiment, is illustrated. The method 300 comprises disposing a first heat transfer fluid in a first cooling circuit within a first terminal of a battery (step 302). The first terminal may be a positive terminal, such as at least one positive terminal 4. The method 300 may further comprise disposing a second heat transfer fluid in a second cooling circuit within a second terminal of the battery (step 304). The second heat transfer fluid may be the first heat transfer fluid. The second heat transfer fluid may be the same as the first heat transfer fluid or different than the first heat transfer fluid. The first cooling circuit and the second cooling circuit may be fluidly coupled. The second terminal may be a negative terminal, such as at least one negative terminal 5.

The method 300 further comprises flowing the first heat transfer fluid through a first coolant inlet and out a first coolant outlet (step 306). The first coolant inlet may be disposed on the first terminal of the battery and in fluid communication with the first cooling circuit. Similarly, the first coolant outlet may be disposed on the first terminal of the battery and in fluid communication with the first cooling circuit. The method may further comprise flowing the second heat transfer fluid through a second coolant inlet and a second coolant outlet (step 308). The second coolant inlet may be disposed on the second terminal of the battery and in fluid communication with the second cooling circuit. Similarly, the second coolant outlet may be disposed on the second terminal of the battery and in fluid communication with the first cooling circuit. In an example embodiment, the first coolant outlet is in fluid communication with the second coolant inlet, which may allow a single heat transfer fluid to flow through both terminals.

Figure 4:
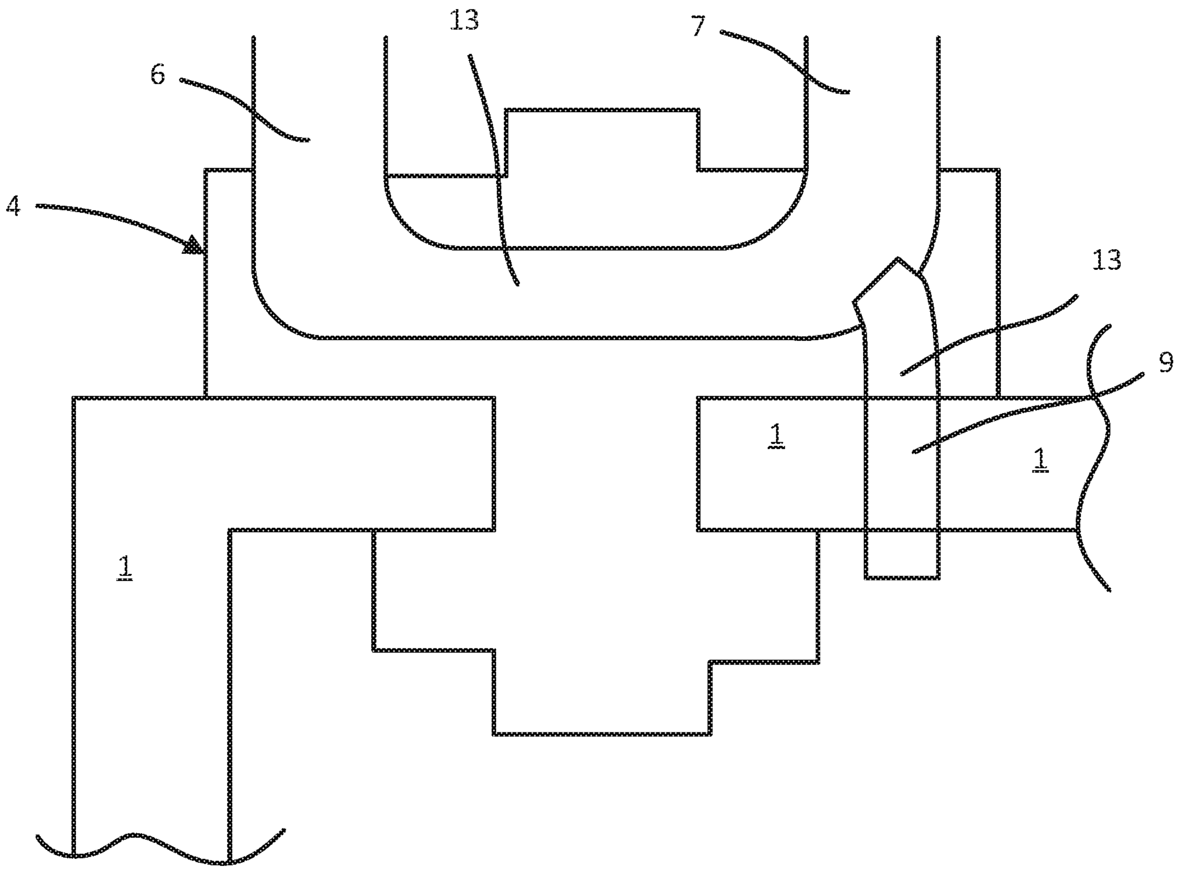
FIG. 4 illustrates a detail view of a cross-section of battery system having a battery terminal from FIG. 1, in accordance with an example embodiment.

Referring now to FIG. 4, a detail view of a cross-section of battery system having a battery terminal from FIG. 1, in accordance with an example embodiment, is illustrated. Battery system comprises the sealed case 1 and the positive terminal 4. The positive terminal 4 comprises a coolant inlet 6, a coolant outlet 7, a dispensing port 9, and a thermally sensitive plug 12. The positive terminal 4 may further comprise a fluid conduit 13 extending between the coolant inlet 6 and the coolant outlet 7. The dispensing port 9 may be fluidly coupled to the fluid conduit 13 and an inside of the sealed case 1. The thermally sensitive plug 12 may be disposed in the dispensing port 9. The thermally sensitive plug 12 may seal the sealed case 1 from a heat transfer fluid disposed in the cooling conduit 13 during normal operation. In various embodiments, a heat transfer fluid in the cooling conduit 13 is passive in normal operation (e.g., the fluid is static in cooling conduit 13). In various embodiments, a heat transfer fluid in the cooling conduit 13 is active in normal operation (e.g., the fluid flows through the cooling conduit 13).

A battery system is disclosed herein. The battery system may comprise: a sealed case having an internal cavity; an internal electrode stack disposed in the internal cavity; and a first terminal comprising: a first coolant inlet; a first coolant outlet and a first fluid conduit coupled to the first coolant inlet and the first coolant outlet.

In various embodiments, the battery system further comprises a heat transfer fluid configured to flow through the first coolant inlet, the first fluid conduit, and the first coolant outlet. The battery system may further comprise a first dispensing port coupled the fluid conduit, wherein the heat transfer fluid is configured to release through the first dispensing port into the internal cavity of the sealed case and contact the internal electrode stack to prevent a thermal runaway event. The battery system may further comprise a first thermally sensitive plug configured to melt at a temperature threshold to release the heat transfer fluid through the first dispensing port during the thermal runaway event. The first terminal may be configured to actively cool the battery system during operation.

While the principles of this disclosure have been shown in various embodiments, many modifications of structure, arrangements, proportions, elements, materials and components (which are particularly adapted for a specific environment and operating requirements) may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments.

However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

When language similar to "at least one of A, B, or C" or "at least one of A, B, and C" is used in the claims or specification, the phrase is intended to mean any of the following: 1 at least one of A; 2 at least one of B; 3 at least one of C; 4 at least one of A and at least one of B; 5 at least one of B and at least one of C; 6 at least one of A and at least one of C; or 7 at least one of A, at least one of B, and at least one of C

What is claimed is:

1. A battery system, comprising:

a sealed case having an internal cavity;

an internal electrode stack disposed in the internal cavity;

a first terminal comprising:

a first coolant inlet; and a first fluid conduit coupled to the first coolant inlet;

a first dispensing port in fluid communication with the first fluid conduit and the internal cavity, the first dispensing port configured to release a heat transfer fluid into the internal cavity of the sealed case to contact the internal electrode stack and to prevent a thermal runaway event; and a first thermally sensitive plug disposed within the first dispensing port.

2. The battery system of claim 1, further comprising a first coolant outlet coupled to the first fluid conduit, wherein the first coolant inlet, the first fluid conduit, and the first coolant outlet are configured to allow the heat transfer fluid to flow therethrough.

3. The battery system of claim 2, further comprising a vent port coupled to the sealed case, wherein the vent port is configured to vent a vapor formed from the heat transfer fluid in the internal cavity during the thermal runaway event.

4. The battery system of claim 3, further comprising a pressure release valve coupled to the vent port.

5. The battery system of claim 3, wherein a temperature of the vapor from the heat transfer fluid is below a flash point of an electrolyte of the internal electrode stack during the thermal runaway event.

6. The battery system of claim 1, wherein the heat transfer fluid is static in the first fluid conduit under normal operating conditions.

7. The battery system of claim 1, wherein the sealed case comprises the first terminal.

8. The battery system of claim 1, wherein the first thermally sensitive plug is configured to melt at a temperature threshold to release the heat transfer fluid through the first dispensing port during the thermal runaway event.

9. The battery system of claim 1, further comprising a second terminal comprising a second coolant inlet and a second fluid conduit coupled to the second coolant inlet, the battery system further comprising a second dispensing port in fluid communication with the second fluid conduit and the internal cavity and a second thermally sensitive plug disposed within the second dispensing port.

10. The battery system of claim 9, further comprising an electrode stack anode and an electrode stack cathode, wherein the first terminal is electrically coupled to the electrode stack anode and the second terminal is electrically coupled to the electrode stack cathode.

11. The battery system of claim 1, comprising a volume of the heat transfer fluid between 1% and 10% of the volume of the sealed case.

12. The battery system of claim 1, wherein a boiling point of the heat transfer fluid is below a peak operating temperature of the battery system.

* * * * *